(12) United States Patent
Himanen et al.

(10) Patent No.: US 10,275,732 B2
(45) Date of Patent: Apr. 30, 2019

(54) DETERMINING PERFORMANCE LEVEL OF SUPERVISOR

(71) Applicant: Polar Electro Oy, Kempele (FI)

(72) Inventors: Teijo Himanen, Jyvaskyla (FI); Tuomas Jomppanen, Oulu (FI)

(73) Assignee: Polar Electro Oy, Kempele (FI)

( * ) Notice: Subject to any disclaimer, the term of this patent is extended or adjusted under 35 U.S.C. 154(b) by 549 days.

(21) Appl. No.: 13/857,381

(22) Filed: Apr. 5, 2013

(65) Prior Publication Data

US 2013/0282447 A1 Oct. 24, 2013

(30) Foreign Application Priority Data

Apr. 19, 2012 (FI) ...................................... 20125425

(51) Int. Cl.
*G06Q 10/06* (2012.01)
(52) U.S. Cl.
CPC .............................. *G06Q 10/06398* (2013.01)
(58) Field of Classification Search
USPC ................................................. 705/7.38, 7.42
See application file for complete search history.

(56) References Cited

U.S. PATENT DOCUMENTS

| | | | | |
|---|---|---|---|---|
| 6,607,483 | B1* | 8/2003 | Holland | A61B 5/02 128/921 |
| 8,070,654 | B2* | 12/2011 | Chapa, Jr. | A63B 24/0006 482/8 |
| 9,457,256 | B2* | 10/2016 | Aragones | G06F 19/3481 |
| 2002/0107433 | A1* | 8/2002 | Mault | G16H 10/20 600/300 |
| 2004/0229729 | A1* | 11/2004 | Albert | A63B 24/0062 482/8 |
| 2004/0241629 | A1* | 12/2004 | Ondrusz | A63B 24/0062 434/247 |
| 2005/0209887 | A1* | 9/2005 | Pollner | G06Q 30/02 705/3 |

(Continued)

FOREIGN PATENT DOCUMENTS

WO 01/16855 A2 3/2001

OTHER PUBLICATIONS

Search Report for Finnish Patent Application No. 20125425, dated Mar. 20, 2013, 2 pages.

(Continued)

*Primary Examiner* — Jeff Zimmerman
(74) *Attorney, Agent, or Firm* — FisherBroyles, LLP (57) ABSTRACT

There is provided an apparatus caused at least to acquire information of a supervisor identifier allocated to a supervisor who is registered to a network environment accessible by a plurality of supervisors and by a plurality of clients; acquire information of a different client identifier allocated to each client registered to the network environment; associate at least one client identifier with the supervisor identifier on the basis of a notification of whether or not the client is co-operating with the supervisor; acquire at least one activity metric related to the at least one client corresponding to the at least one client identifier associated with the supervisor identifier; and determine a performance level of the supervisor corresponding to the supervisor identifier at least partly on the basis of the acquired at least one activity metric.

18 Claims, 6 Drawing Sheets

(56) References Cited

U.S. PATENT DOCUMENTS

| | | | |
|---|---|---|---|
| 2007/0033069 A1* | 2/2007 | Rao | A63B 24/00 705/2 |
| 2007/0219059 A1* | 9/2007 | Schwartz | A61B 5/0205 482/8 |
| 2009/0233771 A1* | 9/2009 | Quatrochi | A63B 24/0075 482/9 |
| 2009/0234720 A1* | 9/2009 | George | G06Q 10/06 705/7.42 |
| 2010/0009330 A1* | 1/2010 | Yaskin | G09B 7/00 434/350 |
| 2010/0017402 A1* | 1/2010 | Fleming | G06Q 50/20 707/E17.005 |
| 2010/0169144 A1* | 7/2010 | Estill | G06Q 10/0637 705/7.36 |
| 2011/0060620 A1* | 3/2011 | Guidi | G06Q 10/06315 705/7.25 |
| 2011/0212424 A1* | 9/2011 | Smith | G06Q 10/10 434/247 |
| 2012/0015779 A1* | 1/2012 | Powch | A61B 5/02055 482/9 |
| 2012/0035987 A1* | 2/2012 | Anand | G06Q 10/06398 705/7.42 |
| 2012/0059664 A1* | 3/2012 | Georgiev | A61B 5/02 705/2 |
| 2012/0191469 A1* | 7/2012 | Akradi | G06Q 50/22 705/2 |
| 2012/0253484 A1* | 10/2012 | Burich | G06F 19/3418 700/91 |
| 2012/0254934 A1* | 10/2012 | McBrearty | G06F 19/00 725/118 |
| 2012/0264570 A1* | 10/2012 | Watterson | A63B 24/0084 482/8 |
| 2012/0274508 A1* | 11/2012 | Brown | G04F 10/00 342/357.25 |

OTHER PUBLICATIONS

Office Action for Finnish Patent Application No. 20125425, dated Mar. 20, 2013, 14 pages.

* cited by examiner

| SUPERVISOR ID | CLIENT ID |
|---|---|
| ID#1 | ID#1, ID#2, ID#10, ID#14 |
| ID#2 | ID#1 |

FIG. 4

| PERFOMANCE LEVEL | RANGE OF ENTRIES |
|---|---|
| LOW | 0-10 |
| MEDIUM | 11-20 |
| HIGH | 21- |

FIG. 5

600 DETECT WHEN THE CLIENT INVITES PEOPLE TO REGISTER AND/OR WHEN A NEW REGISTRATION IS BASED ON AN INVITATION MADE BY THE CLIENT

602 ACQUIRE AT LEAST ONE ACTIVITY METRIC INDICATING THE NUMBER OF INVITATIONS AND/OR THE NUMBER OF NEW REGISTRATIONS, WHEREIN THE PERFORMANCE LEVEL IS PROPORTIONAL TO THE VALUE OF THE ACQUIRED ACTIVITY METRIC

FIG. 6

700 DETECT A TRANSACTION MADE BY THE AT LEAST ONE CLIENT WITH RESPECT TO SERVICES AND/OR PRODUCTS VIA THE NETWORK ENVIRONMENT

702 ACQUIRE AT LEAST ONE ACTIVITY METRIC INDICATING THE NUMBER OF TRANSACTIONS MADE BY THE AT LEAST ONE CLIENT, WHEREIN THE PERFORMANCE LEVEL IS PROPORTIONAL TO THE VALUE OF THE ACQUIRED ACTIVITY METRIC

```
1400 RANK THE SUPERVISORS ACCORDING TO THE DETERMINED PERFORMANCE LEVELS
                              ↓
1402 ALLOCATE THE SUPERVISOR TO A SUPERVISOR PERFORMANCE CLASS
```

FIG. 14

```
1500 GRANT AN ACCESS TO THE PREDETERMINED BENEFIT TO THE SUPERVISOR
                              ↓
1502 DETECT WHEN THE BENEFIT IS APPLIED BY THE SUPERVISOR
                              ↓
1504 REMOVE THE ACCESS GRANT FROM THE SUPERVISOR
```

FIG. 15

DETERMINING PERFORMANCE LEVEL OF SUPERVISOR

CROSS-REFERENCE TO RELATED APPLICATION

This application claims priority based on Finnish Application No. 20125425, filed Apr. 19, 2012, which is incorporated herein by reference in its entirety.

BACKGROUND

Field

The invention relates generally to cooperation between a supervisor and his/her client(s). The invention relates generally to determining a performance level of a supervisor, such as a personal trainer or a coach, etc. The invention also relates in ranking the supervisors and rewarding the supervisors.

Description of the Related Art

Nowadays people seek for better performances in the field of sport by applying personal trainers, supervisors or coaches. However, different supervisors vary in their performance levels, e.g. in how successful they are in getting their clients to reach the targets and be active. There is no systematic way to follow supervisors' performance level and, therefore it is useful to find a solution for determining performance level of a supervisor.

SUMMARY

According to an aspect of the invention, there is provided an apparatus as specified in claim 1.

According to an aspect of the invention, there is provided a method as specified in claim 17.

According to an aspect of the invention, there is provided a computer program product as specified in claim 18.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

BRIEF DESCRIPTION OF THE DRAWINGS

In the following, the invention will be described in greater detail with reference to the embodiments and the accompanying drawings, in which

FIGS. 6 to 11A, and 12A show methods according to some embodiments;

DETAILED DESCRIPTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
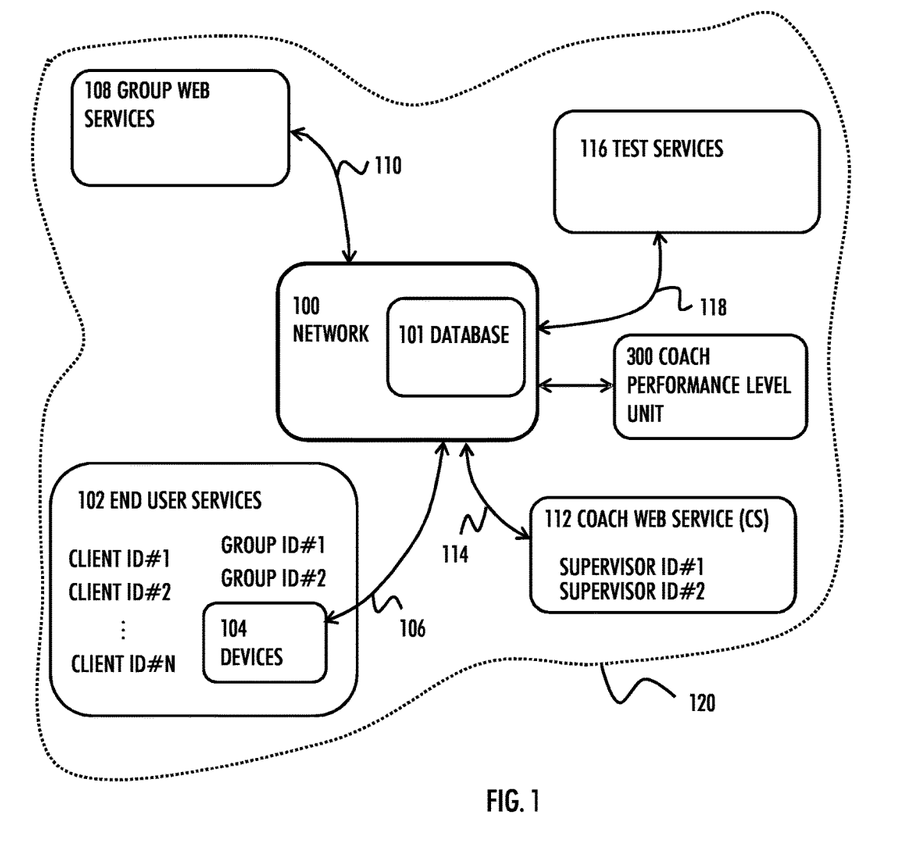
FIG. 1 presents a network environment, according to an embodiment.

FIG. 1 shows a network environment 120 or a network system comprising a plurality of functional units 101, 102, 108, 112, and 116 connected to each other via a wireless or a wired network 100. There may also be other units present in such network environment 120, although not shown. For example, a web service for third parties may be present in order to allow the third parties to purchase products or services from the system 120 via the network 100, for example. In an embodiment, the network environment 120 presented in FIG. 1 is a Polar ecosystem developed and provided by Polar Electro, or a part of such network environment. The functional units 101, 102, 108, 112, and 116 may locate on a same or on different servers in the network environment 120.

The network environment 120 may allow clients, i.e. customers, and/or supervisors, e.g. trainers, to access the network environment 120 once they are registered to the system 120. There may a plurality of users associated with different identifiers (client ID#1, ID#2, . . . , ID#N and supervisor ID#1, ID#2, . . . , ID#N) who may access the system via the wireless or wired communication network. In an embodiment, some of the clients may be grouped groups of one or more members. Each group may have its own group ID.

In an embodiment, the client is a trainee, a pupil, a student, or a team/group member. In an embodiment, the supervisor is a coach, an instructor, a teacher, a trainer, or a personal trainer.

The clients are typically trainees having different IDs and possibly possessing at least one device 104. The clients may connect to the system 120 by applying end user services 102, for example. The at least one device 104 may be, for example, a heart rate monitor, a sensor for detecting a physiological activity during a training session, a mobile phone capable to acquire information related to a training session, a cadence sensor, a step counter, a watch, etc. In practice any device capable of acquiring information related to a training session is applicable. The information may be of various kinds, including for example, heart rate, heart beat interval, heart beat variation, duration of training session, calories burned, length of a running session in meters, etc.

The system 120 may comprise a database 101 to which the clients may upload their training data, as depicted by the arrow 106. The database 101 may also detect and store information regarding the usage of the network environment 120 by the clients. The clients may connect to the database 101 via the network 100 and upload data from their devices 104. The device 104 may be connectable to a personal computer, or to any device, which is used in accessing the database 101 in the network 100. Such connection between the device 104 and the personal computer may be accomplished by applying the Bluetooth® and/or WiFi standard, or any other suitable standard/non-standard wireless communication method utilizing electric and/or magnetic fields. An exemplary frequency for this type of transmission is 2.4 GHz, for instance. Alternatively, the transmission may be performed via infrared signaling, for example.

The end user services 102 may comprise services aimed for individual customers. These services may include a Polar Personal Trainer (PPT) web service, for example, which clients may register to. It may be that the clients first connect to the PPT service by applying a user name and a password, and then transfer the training data from their devices 104 to the database 101, which database 101 is accessible by the PPT service. The PPT service may also allow the clients to create a training program or training programs and edit it/them according to the client's personal needs and aims. These tailored training programs may be downloaded to the devices 104 as shown in the Figure with the arrow 106. The client may also change the settings of his/her device(s) 104 in the PPT service and download the device's 104 settings from the PPT service via the network 100 to the device 104. The PPT service may additionally allow the client to keep a versatile training diary. The clients may monitor the development of their physiological condition and explore data related to each training session individually or over a predetermined time frame comprising a plurality of training sessions, for example, by accessing the data on the database 101, possibly via the PPT service. The PPT service may be connected to the database 101 to which customers may upload their training files. The PPT 109 may then show for example training calendars and summary information, such as a durations, distances, energy expenditures and heart rate distribution in heart rate zones to the customer having an ID associated to the training information on the database 101.

The networked system 120 as shown in FIG. 1 may also comprise a coach web service 112, or simply a coach service (CS). The supervisors having certain identifiers (supervisor IDs) may connect to the environment 120 via the CS 112 and the connection 114. The CS 112 is a service which may be run via the network 100. The CS 112 may be connected to the database 101 in order to allow the supervisor to have access to his clients' data. The clients may be clients of the PPT service, e.g. registered users of the PPT service who apply a personal trainer or personal trainers. Owing to the capabilities of the network environment, the supervisor may be capable of monitoring his clients'/groups training data and possibly also to modify the clients' current training programs and/or to create new training programs for the clients/groups.

The network environment 120 may also comprise test services 116 accessible via the network connection 118. These services may include services which may be purchased and/or used by the supervisors or the clients, such as a body age service. The test web services 116 have a capability to make an assessment of the clients physiological conditions based on physiological measurements and/or questionnaires. Such physiological condition may include body weight, maximum oxygen uptake, body flexibility measures, blood pressure, body composition measures. In an embodiment, the physiological condition is characterized by client's body age. The body age service determines your body age versus your actual age. With a person having exercised regularly, the body age may be smaller than the person's actual age, and vice versa.

There may also be group web services 108 available in the networked system 120. The group web services may connect to the networked environment 120 via a connection 110, as shown. The group web services 108 may be used for the purposes of business-to-business marketing, such as for different gyms, teams, etc. The group web services may further offer services, such as Gardio GX by Polar Electro, TEAM2 System by Polar Electro, to teams, etc., for example. Different teams may provide exercise data to the database 101, for example. In an embodiment, the CS 112 may observe the exercise data regarding the teams/groups in the database 101. The CS 112 may also provide instructions to the groups associated with the group web serviced 108, similarly as for the individual clients.

Any service in the network environment 120 may be provided by functionalities performed due to execution of software stored in a server, wherein the server has access to the network environment 120, and/or by a device 104 of the client. The server may be comprised in the network environment 120, for example.

However, there may a large number of supervisors and it may be difficult to select a suitable supervisor for a client's needs. The supervisors may also require triggers to keep their motivation in helping the clients high. It may also be important to motivate the coaches/supervisors to have as much customers as possible.

Figure 2:
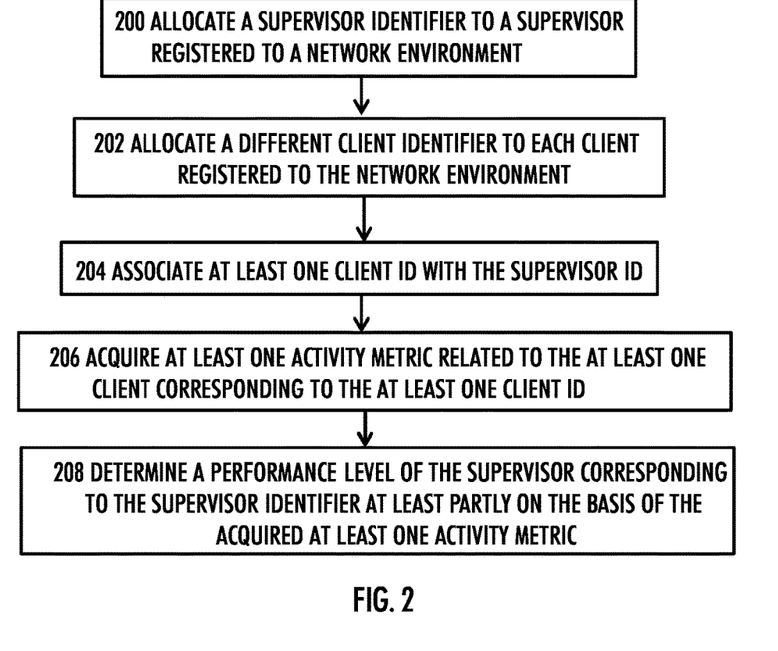
FIG. 2 shows a method according to an embodiment.

Therefore, it is proposed, as shown in FIG. 2, to acquire information of a supervisor identifier allocated to a supervisor in step 200. The supervisor may be registered to the network environment 120 accessible by a plurality of supervisors and by a plurality of clients. The supervisor identifier (ID) may be a numerical or alphabetical sequence, for example. The supervisor may be identifiable by the network environment 120 via the supervisor ID.

In step 202 it is proposed to acquire information of a different client identifier allocated to each client registered to the network environment. The client ID may also be called a client or a customer ID. Also here it may be appreciated that the clients may be distinguished via the client ID in the environment 120. The client ID may be a numerical or alphabetical sequence, for example. The client may be identifiable by the network environment 120 via the client ID.

These supervisor IDs and client IDs, each corresponding to a certain supervisor or a client, may be allocated to the supervisors or to the clients by the environment 120. The identifier may be allocated to the supervisor/client upon registration of the supervisor/client to the system 120. In an embodiment it may be detected when such registration to the network environment 120 takes place. Thus, the ID of the supervisor/client may be acquired upon registration. Alternatively, it may be acquired at a later time from the network environment 120, such as when the client becomes a client of a certain supervisor.

The environment 120 may thus comprise a control circuitry and a memory, although not shown in FIG. 1, which may cause the network environment 120 to perform such allocations. The allocated sequences may be predetermined according to a certain criteria or given randomly. The sequences may be stored in a memory unit of the network environment. The network environment 120 may require an authentication to be performed before the supervisor or the client is allowed to entry to the environment 120. The authentication may be made in order to verify that the supervisor/client is the person corresponding to the ID. Such authentication procedure may apply the use of a password and a user name, for example, as known by a skilled person.

In step 204 it is proposed to associate at least one client ID with the supervisor ID on the basis of a notification of whether or not the client is cooperating with the supervisor. The notification may be made by the supervisor or the client, or both. In an embodiment, once the other party (such as the supervisor) makes such notification, the second party (e.g. the client) needs to verify that the notification is valid. The co-operation between the supervisor and the client may be seen to exist from the moment of the validation. In an embodiment, the notification may be made by the supervisor and/or the client electrically in the coach web service 112 and/or in the end user services 102, for example. Such associations between different supervisors and clients may be stored in a memory location. In an embodiment, the notification indicates that the client becomes a trainee of a certain supervisor.

In step 206 of FIG. 2 it is proposed to acquire at least one activity metric related to the at least one client corresponding to the at least one client ID associated with the supervisor ID. Such activity metric may be acquired, for example, from the database 101 to which the clients may upload information regarding exercise(s) performed. Alternatively or in addition to, the activity metric may be determined without any information from the database 101. The activity metric and how it is acquired will be detailed later.

In step 208, a performance level of the supervisor corresponding to the supervisor identifier is determined at least partly on the basis of the acquired at least one activity metric. In an embodiment, for example, the performance level of the supervisor is increased or decreased on the basis of whether the physiological condition of the at least one client associated to the supervisor is detected to improve or degrade, respectively. It may be advantageous to be able to derive such performance levels for a plurality of supervisors because the performance level may be used by the clients in selecting a supervisor who may, with a high probability, help the client to meet his/her targets, for example. The clients may check the performance level, i.e. the competence score, of the supervisor and apply the level in determining which supervisor to choose. Such information may reduce the time the clients need to spend in searching for the suitable supervisor. The search of the supervisor may take place in the network environment 120. Therefore, the less time is spent for the search of the supervisor, the more capacity of the network may be available for other purposes.

It should be noted that the client does not acquire any activity points or bonus merits to him/herself but the activity of the client is for the benefit/harm of the supervisor/coach, thereby tempting the supervisor to act so that the clients meet their targets, etc. As appreciated by a skilled person, this may be advantageous for the client and for the supervisor. Therefore, the proposed solution is significantly different than those bonus systems where the person acting acquires bonus points for him/herself, such as the travelling bonus, for example. It should be also noted that in the travelling bonus systems, the activity of the person is never for the harm of the person, whereas in the proposed solution, lack of exercise by the client may decrease the performance level of the supervisor.

In an embodiment, the client influencing the performance level of the supervisor is not aware of the fact that the client's actions affect the performance level of the supervisor of the client. For example, the client may not be aware of the fact that the client's activities may be for the benefit or harm of the coach/client. For example, when the client's physiological condition has degraded, the performance level of the supervisor associated to the client may decrease, and vice versa.

FIG. 1 shows that the network environment may also comprise a functional unit/apparatus 300, such as a data processing device, for determining the performance level of the coach. The unit 300 may locate on a server having access to the network environment 120. The server may be the same as where the coach web service 112 is located, but it need not to be. The coach performance level unit 300 may access at least some of the other functional entities in the environment 120, such as the database 101 and the CS 112, for example.

Figure 3:
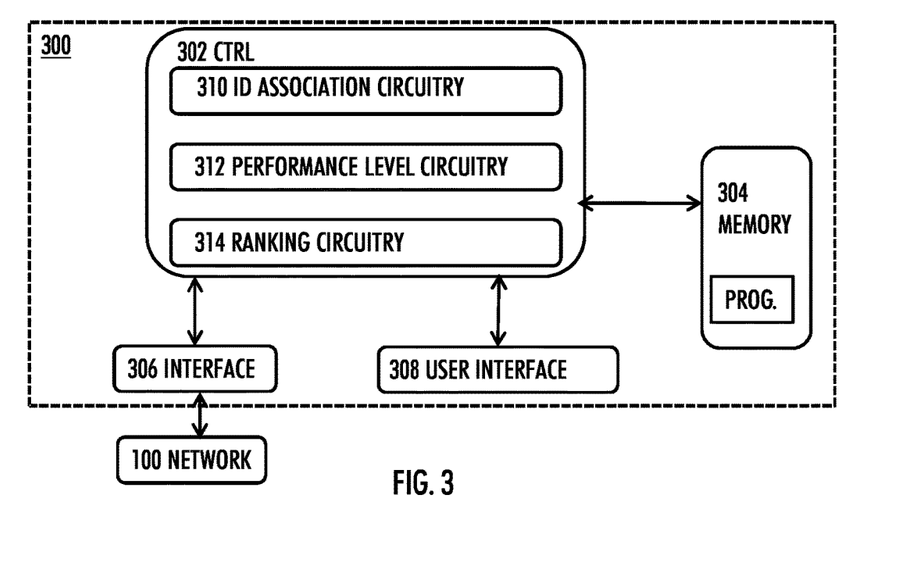
FIG. 3 shows an apparatus according to an embodiment.

FIG. 3 shows the apparatus 300 in more details. FIG. 3, provides an apparatus 300 comprising a control circuitry (CTRL) 302, such as at least one processor, and at least one memory 304 including a computer program code (FROG), wherein the at least one memory 304 and the computer program code (FROG), are configured, with the at least one processor 302, to cause the apparatus 300 to carry out any one of the embodiments described throughout the application. It should be noted that FIG. 3 shows only the elements and functional entities required for understanding a processing system of the apparatus 300. Other components have been omitted for reasons of simplicity. It is apparent to a person skilled in the art that the apparatus may also comprise other functions and structures.

As said, the apparatus 300 may comprise a control circuitry 302, e.g. a chip, a processor, a micro controller, or a combination of such circuitries causing the apparatus to perform any of the embodiments of the invention. The control circuitry 302 may be implemented with a separate digital signal processor provided with suitable software embedded on a computer readable medium, or with a separate logic circuit, such as an application specific integrated circuit (ASIC). The control circuitry 302 may comprise an interface, such as computer port, for providing communication capabilities. The memory 304 may store software (PROG) executable by the at least one control circuitry 302. The memory 304 may be implemented using any suitable data storage technology, such as semiconductor based memory devices, flash memory, magnetic memory devices and systems, optical memory devices and systems, fixed memory and removable memory.

The apparatus 300 may further comprise interface components 306 providing the apparatus with communication capabilities with the radio access network 100 of the network environment 120. The components 306 may comprise a communication port, for example. The apparatus 300 may also comprise a user interface 308 comprising, for example, at least one keypad, a microphone, a touch display, a display, a speaker, etc. The user interface 308 may be used to control the apparatus 300 by the user, if needed.

Figure 4:
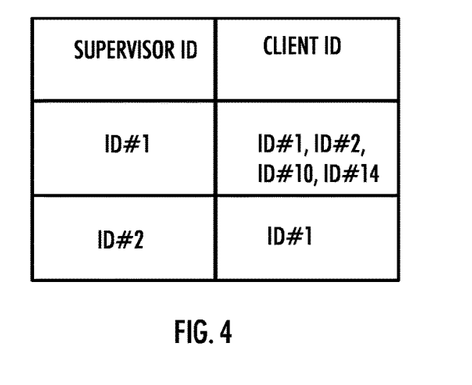
FIGS. 4 and 5 show tables according to some embodiments.

The control circuitry 302 may comprise an ID association circuitry 310 for associating at least one client ID with the supervisor ID. The associated IDs may be stored in the memory 304, for example. For this, the circuitry 310 may detect when a client and a supervisor make a notification of co-operation according to which the client becomes a trainee of the supervisor, for example. The notification may be made in a service of the network environment 120 to which the apparatus 300 is connected to or has access to. Such co-operation may denote that the supervisor is granted an access to the training program(s) and exercise data of the client. In an embodiment, from the moment when the IDs have been associated with each other, the activity of the client may affect the performance level of the supervisor. As shown in FIG. 4, there may be only one client (ID#1) associated with the supervisor (ID#2), or there may be a plurality of clients (ID#1, ID#2, ID#10, ID#14) associated to a single supervisor (ID#1). Similarly, the same client (ID#1) may be associated to a plurality of supervisors (ID#1, ID#2) such that the activity of the client (ID#1) affects the performance level of the plurality of supervisors (ID#1, ID#2).

The control circuitry 302 may comprise a performance level determination circuitry 312. The circuitry 312 may acquire at least one activity metric related to the at least one client corresponding to the at least one client ID associated with the supervisor ID. In an embodiment, the circuitry 312 may detect the activities of the client(s) with a certain ID/IDs linked to the supervisor ID. The activity metric may then be used in determining the performance level of the supervisor with the linked supervisor ID. Let us take a closer look at what the activity metrics may be and how the circuitry 312 may obtain them. The word client in the following denotes the client or clients with an ID/IDs which is/are associated to the supervisor ID.

In an embodiment, at least one activity metric indicates the activity of the at least one client in using the network environment 120. The use may be detected or measured in a plurality of ways. These may include at least one of the following: number of log-ins to the network environment 120 during the observation window, accumulated duration during which the at least one client is logged in to the network environment 120 over the observation window, for example. As said, the login to the environment 120 may require authentication to verify the identity of the client. When the identity is verified, the client with the corresponding ID may be detected to have entered to the system. Consequently, the circuitry 312 may detect the number of entries and/or the duration of time spent in the environment/system 120. In an embodiment, when the client is active in using the environment 120, the supervisor of the client may be given a higher performance level than when the client is not active in using the environment 120. A low activity, such as below a predetermined (e.g. empirically derived) threshold, may decrease the performance level of the supervisor.

Figure 5:
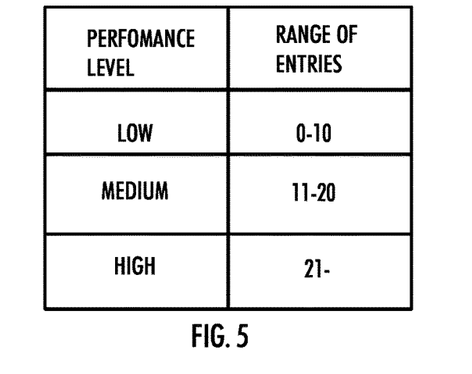

In an embodiment, the at least one activity metric is based on activities of the at least one client. In an embodiment, the activities may be observed during an observation window of a predefined length. In an embodiment, the circuitry 312 may determine the performance level for the first time at the end of the first observation window, wherein the determination is based on the absolute value of the acquired activity metric. There may be predetermined numerical range to which the detected amount of entries may fall into, as shown in FIG. 5. The supervisor may be given a performance level according to range of entries to which the number of entries made by his/her client(s) fall into. For example, when the number of entries during the observation period is between 0 and 10, the performance level given to the supervisor may be low. When the number of entries is between 11 and 20, the performance level may be medium. High performance level may be given when the number of entries is higher than 21. It should be noted that FIG. 5 merely for illustrative purposes. Similar scheme may be adapted to the other possible activity metrics as will be described. When there is a plurality of clients co-operating with the same supervisor, the number of entries of the clients may be accumulated or averaged, for example.

After the first determination, the performance level may be updated according to a predetermined interval. In an embodiment, the update is based on whether or not the activity metric is decreased or increased compared to the previously acquired activity metric. Thus, the update of the performance level may follow a different table according to which a small decrease in the number of entries decreases the performance level less than a high decrease in the number of entries. Thus, the actual number of entries may not be critical, but the change to the previous detected number of entries may be. In another embodiment, the update is based on what is the absolute value of the activity metric, irrespective of the increase or decrease of the activity metric compared to the previous value.

Figure 6:
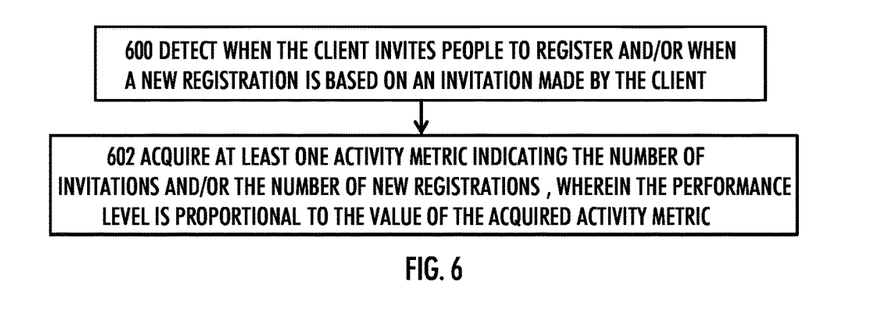

In an embodiment, as shown in FIG. 6, circuitry 312 may detect in step 600 when the at least one client invites people to register to the network environment 120 and/or when a new registration to the network environment 120 is at least partly based on an invitation made by the at least one client. The detection of the former case may take place when the at least one client invites persons via the network environment 120. For example, the client may be logged in to the network environment 120 and the client may control his/her actions in the environment 120 via a user interface, for example. When the client clicks a link to a social media, such as the Facebook, the Twitter, etc., the circuitry 312 may detect this. Similarly, when the user interface of the network environment provides an "invite friends/people" button, or alike, the circuitry 312 may detect when the button is clicked. The "invite friends/people" button may cause the network environment 120 to send an email to the invited person, or cause a social media to display a status update in the clients social media account. In order to enable the case where it is detected when a new registration to the network environment 120 is at least partly based on an invitation made by the at least one client, a new person registering may be asked to indicate has he/she received an invitation to do so. The invitations may be given an identifier by the network environment 120 which is associated to the client ID in order to specify which client has invited which persons. Alternatively, the user name of the client who invited the new person may be specified during the registration process of the new person.

The circuitry 312 may then in step 602 acquire at least one activity metric indicating the number of invitations made by the at least one client and/or the number of new registrations to the network environment at least partly based on an invitation made by the at least one client, wherein the performance level of the supervisor is proportional to the number of invitations and/or registrations. Thus, a client who is active in marketing the network environment 120 may acquire "bonus points" for the supervisor. In the adverse case, a client who does not perform any actions in marketing the environment 120 may cause the supervisor to loose these "bonus points" or at least not contribute in increasing the performance level of the supervisor.

Figure 7:
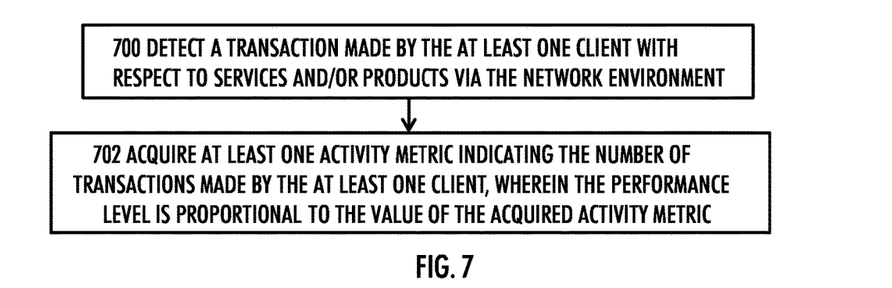

In an embodiment as shown in FIG. 7, the circuitry 312 may in step 700 detect a transaction made by the at least one client with respect to services and/or products via the network environment 120. This may be enabled by monitoring the client ID of the supervisor purchasing products or services while being registered to the environment 120. The service acquired may be a service provided by the test services-functional unit 116 of the network environment 120, such as the Body Age-service. The services and/or products purchased may be required to be supported by the network environment 120. For example, when the environment 120 is a Polar ecosystem, the products may need to be Polar products, such as heart rate monitors from Polar Electro, etc, or other products which are connectable to the environment 120. This may be at least partly to ensure that exercise data may be transferred to the environment 120.

The circuitry 312 may in step 702 acquire at least one activity metric indicating the number of transactions made by the at least one client, wherein the performance level of the supervisor is proportional to the number of trans-actions made. Therefore, the more active the supervisor is in causing his/her clients to acquire new products/service, the higher the performance level may be, and vice versa.

Figure 8:
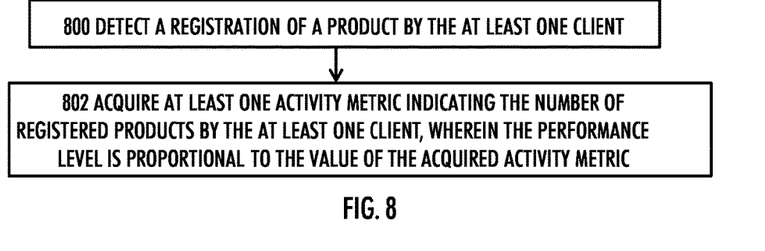

In an embodiment as shown in FIG. 8, the circuitry 312 may in step 800 detect a registration of a product by the at least one client. The product may be, for example, a heart rate monitor, a physical activity sensor, or a mobile software. In an embodiment, the product is required to be a product manufactured by the provider/controller of the network environment 120 at least partly in order to ensure interoperation between the device and the environment 120. For example, when the environment 120 is a Polar ecosystem, the products may need to be Polar products. The client with a client identifier may need to be registered and logged in to the environment 120 when the client registers a new product of the client. It is beneficial to register a new product because different products may have different software, and in order to transfer data, such as exercise information, from the product, it may be important to know the type of the product. As the client is logged in to the system 120 when he/she makes the new product registration, the circuitry 312 may detect the registration made by a client with a certain client ID.

The circuitry 312 may in step 802 acquire at least one activity metric indicating the number of registered products to the network environment by the at least one client, wherein the performance level of the supervisor is proportional to the number of registered products. Thus, the more active the supervisor is in causing his/her clients to register the new products which support the provider of the environment 120, the higher the performance level of the supervisor may be, and vice versa. The number of registered products may be accumulated over a predefined observation period.

Figure 9:
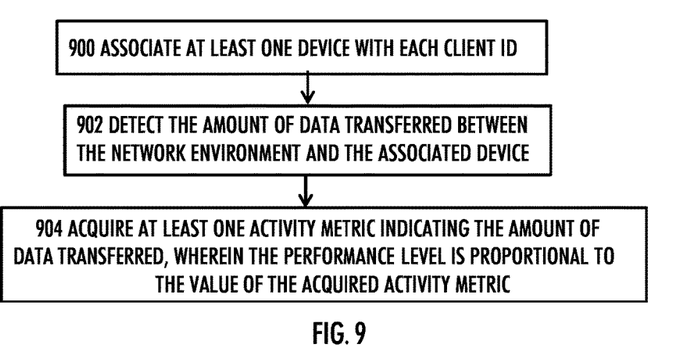

As shown in FIG. 1, the clients/clients may have one or more devices 104. The devices 104 may be used in exercise activities of the client, for example. The circuitry 312 may in step 900 of FIG. 9 associate at least one device 104 with each client ID. The association may be made at the registration of the new device 104, for example. The circuitry 312 may further in step 902 detect the amount of exercise data transferred between the network environment 120 and the associated device 104. In step 904, the circuitry 312 may acquire at least one activity metric indicating the amount of exercise data transferred, wherein the performance level of the supervisor is proportional to the amount of data transferred. A large amount of data transferred may indicate an active client, and, hence a well performed supervisor, and vice versa.

Figure 10:
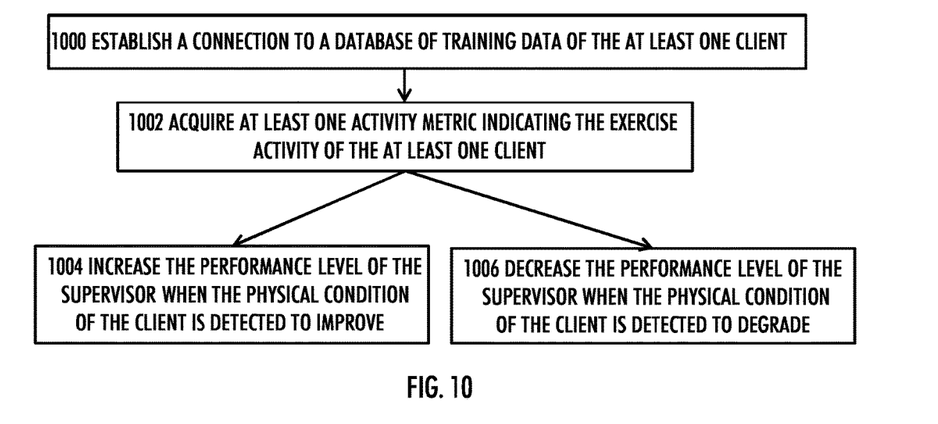

In an embodiment as shown in FIG. 10, the circuitry 312 may in step 1000 establish a connection to the database 101 comprising training data of the at least one client. The connection may be a wireless or a wired connection through the network 100. It should be noted that the database 101 may be the location in the environment 120 for storing exercise related data. In step 1002, the circuitry 312 may acquire at least one activity metric indicating the exercise activity of the at least one client. Also here, the performance level of the supervisor may be proportional to the value of the acquired activity metric.

As a consequence, in an embodiment, the performance level of the supervisor is, in step 1004, increased when the physiological condition of the client associated to the supervisor is detected to improve. Alternatively, in step 1006, the performance level of the supervisor is decreased when the physiological condition of the client associated to the supervisor is detected to degrade. In other words, the circuitry 312 may detect the progress of the client's physiological condition on the basis of the activity metric indicating the exercise activity of the client. Then, the circuitry 312 may change the performance level of the supervisor according to the progress of the client's physiological condition. The performance level may be maintained when the physiological condition is the same as previously. The trend of the physiological condition may be monitored over the observation period, for example.

As may be the case for any of the activity metrics, also for the physiological condition related activity metric, the initial performance level given to a certain supervisor may be determined at the end of the first observation period, and updated subsequently. Alternatively, the initial performance level of the supervisor may be predetermined. For example, the initial level may be "medium", and then it may be later updated. The predetermined observation period may be e.g. 90 days, i.e. sufficiently long to detect a change in the activity metric accurately.

In an embodiment, the exercise activity is measured in body weight progression of the client/client(s). It may be detected whether the weight is decreasing or not. It may further be detected whether the weight progression is towards a set target weight or not. A desired change in the weight may increase the performance level of the supervisor.

In an embodiment, the exercise activity is measured in consumed calories. It may be so that when a client consumes a high amount of calories, the client is exercising a lot. This may increase the competence (performance) level of the supervisor. Alternatively, low amount of calories consumed may lead to decrease of or low performance level. The amount of calories consumed may be observed over the observation period and an update or initial determination of the performance level may be made after the observation period.

In an embodiment, the exercise activity is measured in cumulative exercise duration. The cumulative duration may be accumulated over a predetermined time window, such as the window of FIG. 4A, for example. One possible time window for this purpose is one week. That is, at the end of each week, it is checked how long the client(s) has/have exercised, and this determined amount of time may be used to derive the performance level update or the initial performance level. This may take place either by detecting the change compared to the previous value of the activity metric, or by detecting the range of values into which the absolute value falls into, as depicted with reference to FIG. 5.

In an embodiment, the exercise activity is measured in number of training sessions. Also here, a certain length of observation window may be selected, after which it is checked what the total number is.

In an embodiment, the exercise activity is measured in OwnIndex-values. The OwnIndex test is developed by Polar Electro to measure aerobic (cardiovascular) fitness. It predicts maximal aerobic power indicating the maximal oxygen uptake. An increasing trend in the OwnIndex values may indicate good performance from the supervisor, thus, resulting in an increase of the performance level. In an embodiment each client performs the OwnIndex test regularly and the results may be stored into the database 101. These OwnIndex values may be observed regularly over a predetermined observation period, such as e.g. 90 days. At the end of the observation period, it may be detected whether the trend of the values increasing or decreasing, or whether the values remain substantially the same.

In an embodiment, the exercise activity is measured in RunningIndex. The Running Index is developed by Polar Electro to measure the clients performance (how fast/easily you run at a given pace), which may be directly influenced by aerobic fitness and training economy. Also, here the observation may be long enough to detect a trend in the index values. Increased trend may result in increase of the performance level, and vice versa.

In an embodiment, the exercise activity is measured in Training Load. The Training Load is developed by Polar Electro, and it tells the client how hard the training session was and how much time the supervisor needs to recover from the training session before further training. The Training Load thus indicates the exercise activity of the person. It may be desirable to keep the training load substantially at a moderate level. In this case, the detection that the training load is at the moderate level, may cause increase of the performance level. Naturally this may depend on the training program of the client. In a different training program comprising interval training, for example, the desired training load may comprise regular high training loads periods, for example. Therefore, the effect to the performance level may depend on the set target and whether or not the client is acting according to the set target.

In an embodiment, the exercise activity is measured in average calories consumed per exercise. This may be followed during a certain observation period, as described above. A high amount of average calories may increase the performance level, and vice versa.

In an embodiment, the exercise activity is measured in frequency of exercises. This may be followed during a certain observation period, as described above. A high frequency may increase the performance level, and vice versa.

In an embodiment, the exercise activity is measured in Bodyage. Similar procedure as for the OwnIndex may be applied for the Bodyage values.

In an embodiment, the exercise activity is measured in OwnRelax. The OwnRelax is developed by Polar Electro and is a quick way to test how relaxed the client's body is. The OwnRelax values are measured from the client's heart rate variability and depend on the client's heart rate during the test. Similar procedure as for the OwnIndex may be applied for the OwnRelax values.

In an embodiment, the exercise activity is measured in a maximum heart rate, the resting heart rate, or the variation of the heart rate. In other words, the heart rate parameter may be monitored and its trend (increasing/decreasing) may affect the competence level of the supervisor in a predetermined way.

In an embodiment, the exercise activity is measured in whether or not a set target is reached. As said, the target may be decided between the supervisor and the client. Thereafter, the circuitry 312 may monitor from the data stored in the database 101 whether the person is approaching the target, deviating from the target, or whether the parameter under observation is remaining the same. The parameter under observation may be any parameter which may be monitored. These may include any of the activity metrics related to exercise activity, as given above. That is, for example, weight progression, calorie target, or resting heart rate may be the observation parameter related to the set target.

Figure 11A:
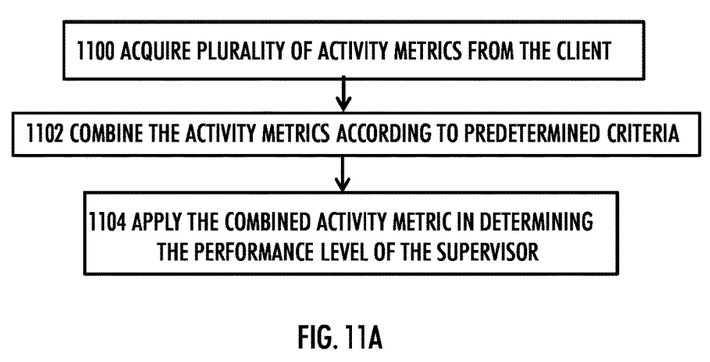

The activity metric which is used as a basis for the determination of the performance level may in an embodiment comprise only one acquired activity metric. Alternatively, the circuitry 312 may in an embodiment, as shown in step 1100 of FIG. 11A, acquire a plurality of activity metrics from a single client. The circuitry may further in step 1102 combine the activity metrics according to predetermined criteria, and, in step 1104, apply the combined activity metric in determining the performance level of the supervisor.

Figure 11B:
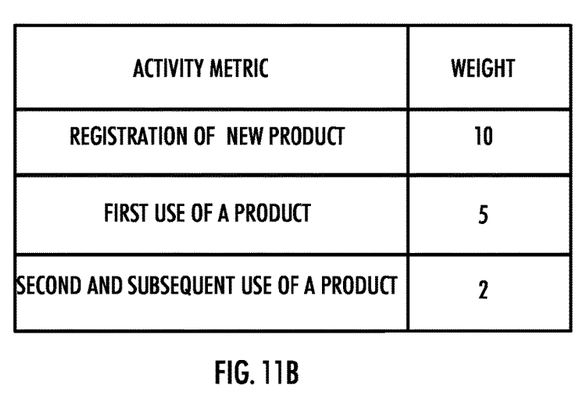
FIGS. 11B and 12B show tables according to some embodiments.

In order to combine the different activity metrics obtained according to a predetermined criteria, there may be a predetermined rules defined. As an example, as shown in FIG. 11B, the circuitry 312 may apply an activity metric-specific weighting coefficient to each acquired activity metric, wherein each weighting coefficient is defined according to at least one predetermined criterion. The value of the weighting coefficient may be based on the significance of the act from the point of view of the network environment 120. For example, a registration of new products is important. Therefore, such act may be given a high weighting coefficient. On the other hand, the first use of the product may be given a higher coefficient than the subsequent use of the product, as shown. The weights illustrated in FIG. 11B are merely examples. As said, each acquired activity may be weighted and an overall combined activity metric may be obtained. In an embodiment, the combined activity metric is the cumulative value of the weighted activity metric values. For example, if a supervisor has registered two new products and used one of them once, the cumulative value may be 25. In case the activity metric relates to an exercise activity, the slope in the trend of the exercise activity may indicate a predetermined weight for the activity metric value, which is used in determining the performance level. For example, a steep slope is weighted with a higher coefficient than a gentle slope. In an embodiment, the difficulty in reaching a set target may indicate the weighting coefficient to be used. For example, if a client #A has a first target of losing 1 kg of weight and the same client has also a second target of consuming significant amount of calories per day, reaching the second target may be weighted more than reaching the first target.

Figure 12A:
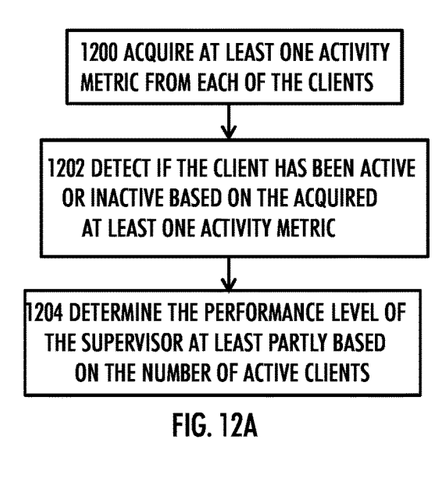

In an embodiment, there may be a plurality of clients co-operating with the same supervisor. In an embodiment, the circuitry 312 may, as shown in FIG. 12A, acquire at least one activity metric from each of the plurality of clients corresponding to the client identifiers in step 1200. In step 1202, the circuitry detect, for each client, whether or not the client has been active or inactive based on the acquired at least one activity metric. Each activity metric may be analyzed as indicated above in order to determine whether or not the client has been active. Predetermined, possibly empirically derived, thresholds may be used for different activity metrics in the determination of whether or not a person is active. Subsequently, the circuitry 312 may, in step 1204, determine the performance level of the supervisor at least partly based on the number of active clients. In case there are three active clients out of 10 clients, the supervisor may be given a performance level 3/10. This ratio may be publicly visual in the supervisor's information.

Figure 12B:
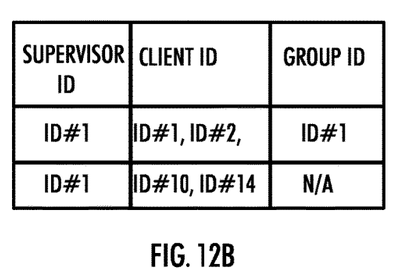

In an embodiment, the clients may form a group of clients, i.e. the supervisor identifier is associated with a plurality of client identifiers. An example group may be a football, an ice hockey team, or a school class. In practice any two persons may form a group. In order to from a group, the client IDs may be associated with a certain group ID, as shown in FIG. 12B. From the figure, it may be seen that the supervisor having the supervisor ID#1 is associated with 4 client IDs (#1, #2, #10, and #14). From these, the clients corresponding to the client IDs #1 and #2 have formed a group having a group ID#1. The other two clients (ID#10 and #14) may act as individuals.

Figure 12C:
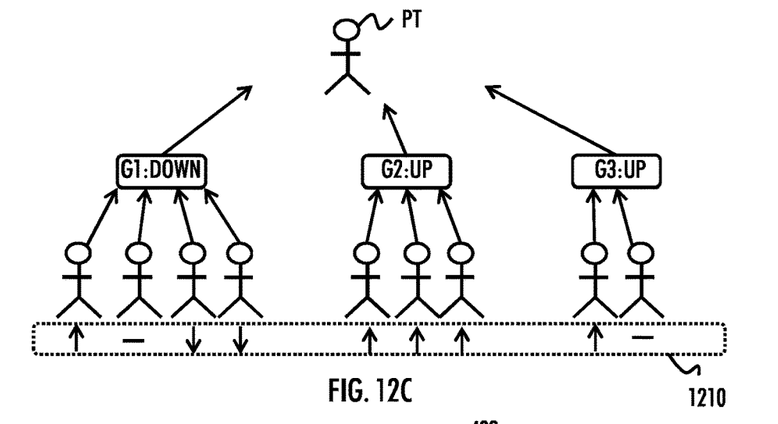
FIG. 12C shows an embodiment where clients have formed groups.

These grouped clients (ID#1, and #2) may provide a single activity metric for use of the circuitry 312, or a plurality of different types of activity metrics, wherein one type of activity metric in provided only once. For example, the group of two individuals may provide one activity metric indicating the calories consumed by the group and one activity metric indicating the trend of the OwnIndex-values. When looking at FIG. 12C, it may be noted that there are three groups (G1 to G3) associated with a personal trainer (PT), each group having members varying from 2 to 4 persons. Based on the acquired activity metrics, let's say the OwnIndex values as given in block 1210 of FIG. 12C, it may be detected that in group G1 one has shown improvement, one's OwnIndex value has remained the same, and two have shown decreasing trend of the OwnIndex. Therefore, as an average, the OwnIndex values of the group #1 have not been improving, Group 2 has been improving and Group 3 has been improving also. As the supervisor is associated with three groups, out of which two have been improving based on the acquired activity metric, the personal trainer may be allocated 2 stars out of 3. This score may be embedded on the personal trainer's information, which gives an objective view on how effective the personal trainer's methods are for fitness improvement.

As said, the at least one activity metric may be based on activities of the at least one client during the observation window of a predefined length. The observation window may be a sliding time window. This is shown in FIG. 4A, where the sliding observation window is shown with overlapping arrows 400A, 400B and 400C. The length of the windows 400A-400C may be empirically derived or the length may be arbitrarily selected. It should be noted that the data required for the acquisition/determination of each of the activity metrics may be monitored and obtained over the observation period, such as the time period 400A to 400C in FIG. 13, for example. At the end of each of the periods, the performance level may be determined and/or updated.

Figure 13:
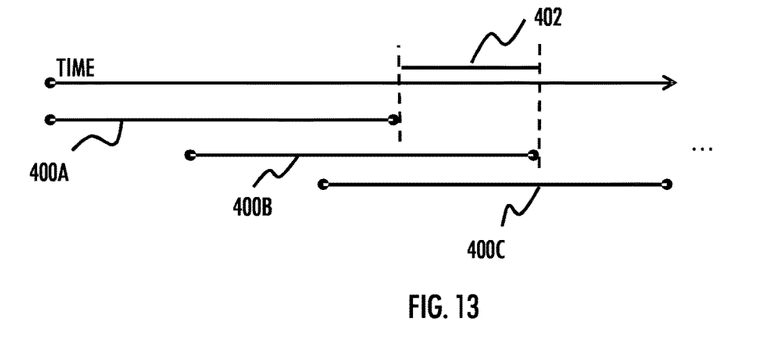
FIG. 13 shows a time line related to some embodiments.

In an embodiment, the length of the time window 400A-400C may be selected to be sufficient in detecting change in the physiological condition of the client, for example. In this case the length may be several days or weeks, for example. In another embodiment, the length of the time window may be significantly shorter, such as one few days, for example. The above given lengths are merely of illustrative purposes and are not limiting. The circuitry 312 may detect the activities of the client during this time period. The detected activities during the period may be used to acquire the activity metric for the client.

In an embodiment, the circuitry 312 determines the performance level at the end of the time windows 400A to 400C. In an embodiment, it may be that the performance level is determined based on the increase or decrease of the physiological condition of the client (i.e. in case the activity metric indicates the trend of the physiological condition of the client) during the period 400A. The circuitry 312 may have detected entries of a certain parameter indicating the physiological condition, such as weigh loss or fitness index, during the observation window 400A. At the end of the period 400A, the circuitry 312 may monitor is the condition increased or decreased and determine the performance level of the supervisor based on the detection.

In another embodiment, the activity metric is an accumulate value based on activities during the observation window 400A. The accumulated value as the activity metric may be used as a basis for determining initially the performance level or in updating the performance level. In one embodiment, the activity metric may indicate the number of exercise events by the client, for example.

The update interval 402 may be predetermined based on empirical derivation, for example. It may also depend on the type of activity metric acquired. For example, when the activity metric relates to the physiological condition, the update interval as well as the predetermined time duration of the observation window may be longer than when the activity metric relates to the usage of the network environment 120, for example. In an embodiment, it may be that the update of the performance metric is made so that the observation windows 400A-400C are not overlapping, i.e. the update interval is at least as long as the time window 400A, for example.

The apparatus 300 of FIG. 3 may also comprise a ranking circuitry 314. In an embodiment, when there are a plurality of supervisors each allocated a different supervisor identifier, the ranking circuitry 314 may rank the supervisors according to the determined performance levels of the supervisors, as shown step 1400 of FIG. 14. This may be beneficial as then the clients of the PPT-com 109, for example, may select their supervisor at least partly according to the performance level of the supervisor. It may be that the supervisor having the highest performance level is given the highest rank, etc. The ranking order may be updated according to a predetermined update interval, such as once a week, for example.

Figure 14:
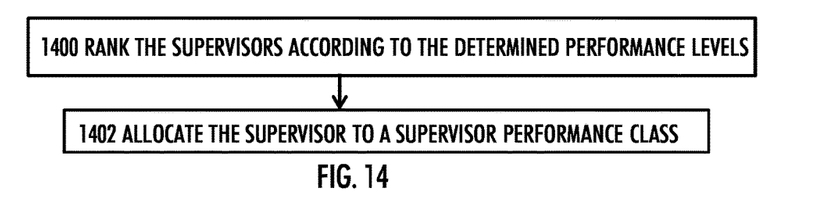
FIGS. 14 to 15 show methods according to some embodiments.

In an embodiment, the circuitry 314 may, in step 1402, allocate the supervisor to one of a plurality of supervisor performance classes on the basis of the determined performance level, each class comprising performance levels within a predetermined range, wherein each class is associated with at least one predetermined benefit to be provided for the supervisor. The performance class #1 may comprise performance levels between 0 and 10, the performance class #2 may values between 11 and 20, for example. The given values are simply for illustrative purposes. It should be noted that when the performance level is given as a ratio of successful clients versus all clients of the supervisor, the ratio may be used for determining the performance class. In this case, the highest class may comprise those supervisors whose all clients' physiological condition has improved, i.e. the ratio is 1, for example. The classes may be defined as classes for "platinum members", "gold members", "silver members", and "bronze members", for example, thus inspiring supervisors to reach for higher class. Thus, the supervisor ID may be associated with a status parameter indicating the performance class of the supervisor. The class of any supervisor may be updated according to predetermined intervals.

Different classes may come with different benefits. Typically, the benefits in the class for gold members are superior over those offered for silver members. The benefits may comprise at least one of the following: a service, a product, discount voucher. The service may be a service obtainable via the network environment 120 in order to allow the environment provider to keep track of the application of the services by the registered supervisor, for example. In an embodiment, the service may be predefined or it may be a service which has not been used so far (or is used less than some test services). In an embodiment, the supervisor may forward the benefit to his/her clients. The service which has not been used a lot (or not at all) may be detected by the circuitry 314 by observing the activity metrics from the clients or the supervisor. Alternatively, the IDs of the supervisor/client associated to any service/product purchase via the environment 120 may be inspected. The product may be a product purchased over the network environment 120 such that the ID of the buyer may be tracked. The voucher may be discount voucher sent to the supervisor corresponding to the supervisor ID. The discount may be for example to a Polar product, for example.

The benefit may also be converted into a financial value. The financial value given to a gold member may be higher than that of the silver member, etc. Each purchase made by the supervisor may decrease the allocated financial value. The financial value may increase upon an update of the performance level if it is detected that the supervisor has performed well.

Figure 15:
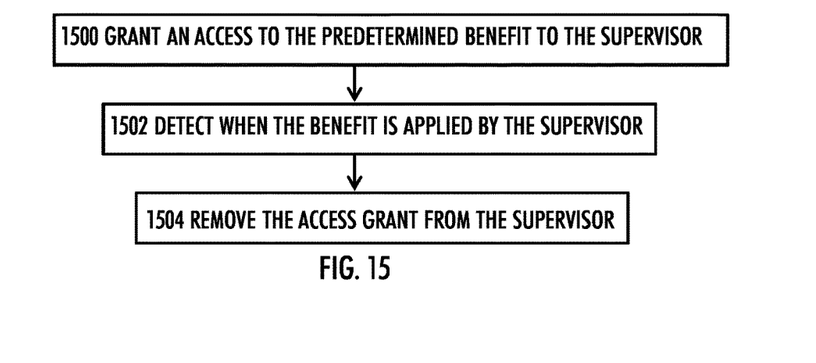

In an embodiment as shown in FIG. 15, the circuitry 314 may, in step 1500, grant an access to the predetermined benefit to the supervisor. This may be beneficial so that the supervisor reaching a certain level of performance is granted an access to the benefit in a controlled manner.

In an embodiment, as shown in step 1502, the circuitry 314 may detect when the at least one predetermined benefit is applied by the supervisor allocated to the certain class, and, consequently in step 1504, remove the access grant from the supervisor corresponding to the supervisor ID. This is advantageous so that the apparatus 300 is in control of the benefits allocated to the supervisors.

The proposed solution thus may advantageously allow people, who are looking for a personal trainer, to find good personal trainers, i.e. those who are able to motivate their clients to reach their targets.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configured to carry out embodiments of any of the FIGS. 1 to 14. In an embodiment, the at least one processor 302, the memory 304, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A system that assists a client in selection of a supervisor that meets at least one need of the client, the system comprising:
   a watch acquiring information related to a training session, the information related to the training session indicating at least one of heart rate, heart beat interval, heart beat variation; and
   a server computer communicatively coupled with the watch via a network environment, the server computer comprising:
      a control circuitry that acquires, using a database located on the server computer, information associated with a supervisor identifier allocated to a supervisor registered to the network environment, the network environment being accessible by a plurality of supervisors and by a plurality of clients, wherein the control circuitry further acquires, from the database located on the server computer, information associated with a different client identifier allocated to each of the plurality of clients registered to the network environment;
      an identifier associating circuitry that associates at least one client identifier with the supervisor identifier on a basis of a notification of whether or not the client is co-operating with the supervisor, wherein the notification is provided to the server computer using a web-based service by one of the supervisor associated with the supervisor identifier and at least one client associated with the at least one client identifier, and wherein the notification is verified by one of (1) the supervisor associated with the supervisor identifier using a supervisor computer and (2) at least one client associated with the at least one client identifier that did not generate the notification using a client computer, the verification validating the notification and indicating an association between the at least one client identifier and the supervisor identifier; and a performance level circuitry coupled with the watch, the performance level circuitry associating the watch with the at least one client identifier based on registration of the watch by the at least one client, the performance level circuitry acquiring at least one activity metric related to the at least one client corresponding to the at least one client identifier associated with the supervisor identifier, wherein the at least one activity metric comprises results of at least one physiological test performed on the at least one client and the information related to the training session indicating at least one of heart rate, heart beat interval, heart beat variation of the client, wherein the performance level circuitry determines a performance level of the supervisor corresponding to the supervisor identifier at least partly on a basis of the acquired at least one activity metric and on a number of registered products by the at least one client, wherein the higher the number of registered new products is the higher the supervisor performance level is, and wherein the performance level circuitry further causes the system to provide the performance level of the supervisor to the client using the server computer, thereby enabling the client to select the supervisor that meets the at least one need of the client.

2. The system of claim 1, wherein the at least one activity metric is based on activities of the at least one client co-operating with the supervisor.

3. The system of claim 1, wherein the performance level circuitry further performs operations comprising:
determining the performance level for a first time at an end of a first observation window, wherein the determination is based on an absolute value of the acquired activity metric; and
updating the performance level according to a predetermined interval, wherein an update is based on whether or not the absolute value of the activity metric is decreased or increased compared to a previously acquired activity metric value.

4. The system of claim 1, wherein the at least one activity metric indicates activity of the at least one client associated with the supervisor in using the network environment.

5. The system of claim 1, wherein the performance level circuitry further performs operations comprising:
detecting a transaction made by the at least one client with respect to services and/or products via the network environment; and
acquiring another activity metric indicating a number of transactions made by the at least one client co-operating with the supervisor, wherein the performance level of the supervisor corresponds to the number of transactions made, wherein the higher the number of transactions is the higher the supervisor performance level is.

6. The system of claim 1, wherein, when the supervisor identifier is associated with a plurality of client identifiers, the performance level circuitry further performs operations comprising:
acquiring an additional activity metric related to each of the plurality of clients co-operating with the supervisor;
detecting, for each client, whether or not the client is active or inactive based on the additional activity metric; and
determining the performance level of the supervisor at least partly based on a number of active clients.

7. The system of claim 1, wherein the at least one physiological test comprises at least two of the following tests: body age test, maximal oxygen uptake test, body relaxation test, running performance test, body weight measurement.

8. The system of claim 1, wherein the performance level circuitry further performs operations comprising determining progression of the results of the at least one physiological test, wherein the at least one physiological test comprises a body age test, and wherein performance level determining is further based on the determined progression of the results of the at least one physiological test.

9. The system of claim 1, wherein the results of the at least one physiological test are acquired by performing at least one of the following measurements: body weight measurement, maximum oxygen uptake measurement, body flexibility measurement, blood pressure measurement, body composition measurement, heart rate variability measurement, and heart rate measurement.

10. The system of claim 1, wherein the performance level circuitry further performs operations comprising:
detecting when the at least one client invites people to register to the network environment and/or when a new registration to the network environment is at least partly based on an invitation made by the at least one client; and
acquiring another activity metric indicating a number of invitations made by the at least one client co-operating with the supervisor and/or a number of new registrations to the network environment at least partly based on an invitation made by the at least one client co-operating with the supervisor, wherein the performance level of the supervisor corresponds to the number of invitations and/or the number of new registrations, wherein the higher the number of invitations and/or new registrations is the higher the supervisor performance level is.

11. The system of claim 1, further comprising:
a ranking circuitry that ranks the plurality of supervisors according to determined performance levels of each of the plurality of supervisors, wherein the performance level circuitry further performs operations comprising allocating each of the plurality of supervisors to one of a plurality of supervisor performance classes on a basis of determined performance level of the supervisor, wherein each class is associated with at least one predetermined benefit to be provided for the supervisor, the performance level circuitry granting an access to the predetermined benefit to the supervisor allocated to a certain class.

12. The system of claim 1, wherein the performance level circuitry further performs operations comprising:
associating at least one device with each client identifier:
detecting an amount of exercise data transferred between the network environment and the associated device; and acquiring at least one activity metric indicating the amount of the exercise data transferred, wherein the performance level of the supervisor corresponds to the amount of data transferred, wherein the higher the amount of data transferred is the higher the supervisor performance level is.

13. The system of claim 1, wherein the performance level circuitry further performs operations comprising:
establishing a connection to the database, the database comprising training data of the at least one client; and
acquiring at least one activity metric indicating the exercise activity of the at least one client associated with the supervisor.

14. The system of claim 13, wherein the performance level circuitry further performs operations comprising changing the performance level of the supervisor according to detected progress of a physiological condition of the client co-operating with the supervisor.

15. The system of claim 1, wherein the performance level circuitry further performs operations comprising:
acquiring a plurality of activity metrics from a single client;
combining the activity metrics according to predetermined criteria; and
applying the combined activity metric in determining the performance level of the supervisor.

16. The system of claim 15, wherein the performance level circuitry further applies an activity metric-specific weighting coefficient to each acquired activity metric, wherein each weighting coefficient is defined according to the predetermined criteria.

17. A method performed by a system that assists a client in selection of a supervisor that meets at least one need of the client, the system comprising a watch acquiring information related to a training session, the information related to the training session indicating at least one of heart rate, heart beat interval, heart beat variation, the system comprising a server computer communicatively coupled with the watch via a network environment, the server computer performing operations comprising:
acquiring, by a control circuitry from a database located on the server computer, information associated with a supervisor identifier allocated to a supervisor registered to the network environment, the network environment being accessible by a plurality of supervisors and by a plurality of clients;
acquiring, by the control circuitry from the database located on the server computer, information associated with a different client identifier allocated to each of the plurality of clients registered to the network environment;
associating, by an identifier association circuitry, at least one client identifier with the supervisor identifier on a basis of a notification of whether or not the client is co-operating with the supervisor, wherein the notification is provided to the server computer using a web-based service by one of the supervisor associated with the supervisor identifier and at least one client associated with the at least one client identifier, and wherein the notification is verified by one of (1) the supervisor associated with the supervisor identifier using a supervisor computer and (2) at least one client associated with the at least one client identifier that did not generate the notification using a client computer, the verification validating the notification and indicating an association between the at least one client identifier and the supervisor identifier;

acquiring, by a performance level circuitry coupled with the watch, at least one activity metric, related to the at least one client corresponding to the at least one client identifier associated with the supervisor identifier, the performance level circuitry associating the watch with the at least one client identifier based on registration of the watch by the at least one client, wherein the at least one activity metric comprises results of at least one physiological test performed on the at least one client and the information related to the training session indicating at least one of heart rate, heart beat interval, heart beat variation of the client;
determining, by the performance level circuitry, a performance level of the supervisor corresponding to the supervisor identifier at least partly on a basis of the acquired at least one activity metric and on a number of registered products by the at least one client, wherein the higher the number of registered new products is, the higher the supervisor performance level is; and
causing, by the performance level circuitry, provision of the performance level of the supervisor to the client using the server computer, thereby enabling the client to select the supervisor that meets the at least one need of the client.

18. A computer program product embodied on a non-transitory distribution medium readable by a computer and comprising program instructions which, when executed by a system, perform a method that assists a client in selection of a supervisor that meets at least one need of the client, the system comprising a watch acquiring information related to a training session, the information related to the training session indicating at least one of heart rate, heart beat interval, heart beat variation, the system comprising a server computer communicatively coupled with the watch via a network environment, the method comprising operations comprising:
acquiring, by a control circuitry from a database located on the server computer, information associated with a supervisor identifier allocated to a supervisor registered to the network environment, the network environment being accessible by a plurality of supervisors and by a plurality of clients;
acquiring, by the control circuitry from the database located on the server computer, information associated with a different client identifier allocated to each of the plurality of clients registered to the network environment;
associating, by an identifier association circuitry, at least one client identifier with the supervisor identifier on a basis of a notification of whether or not the client is co-operating with the supervisor, wherein the notification is provided to the server computer using a web-based service by one of the supervisor associated with the supervisor identifier and at least one client associated with the at least one client identifier, and wherein the notification is verified by one of (1) the supervisor associated with the supervisor identifier using a supervisor computer and (2) at least one client associated with the at least one client identifier that did not generate the notification using a client computer, the verification validating the notification and indicating an association between the at least one client identifier and the supervisor identifier;
acquiring, by a performance level circuitry coupled with the watch, at least one activity metric, related to the at least one client corresponding to the at least one client identifier associated with the supervisor identifier, the performance level circuitry associating the watch with the at least one client identifier based on registration of the watch by the at least one client, wherein the at least one activity metric comprises results of at least one physiological test performed on the at least one client and the information related to the training session indicating at least one of heart rate, heart beat interval, heart beat variation of the client;

determining, by the performance level circuitry, a performance level of the supervisor corresponding to the supervisor identifier at least partly on a basis of the acquired at least one activity metric and on a number of registered products by the at least one client, wherein the higher the number of registered new products is, the higher the supervisor performance level is; and causing, by the performance level circuitry, provision of the performance level of the supervisor to the client using the server computer, thereby enabling the client to select the supervisor that meets the at least one need of the client.

* * * * *